US010880531B2

(12) United States Patent
Sun et al.

(10) Patent No.: US 10,880,531 B2
(45) Date of Patent: Dec. 29, 2020

(54) TRANSFER OF VIDEO SIGNALS USING VARIABLE SEGMENTED LOOKUP TABLES

(71) Applicant: Nvidia Corporation, Santa Clara, CA (US)

(72) Inventors: Yanbo Sun, Santa Clara, CA (US); Tyvis Cheung, Santa Clara, CA (US); Gennady Petrov, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/104,755

(22) Filed: Aug. 17, 2018

(65) Prior Publication Data

US 2019/0238816 A1    Aug. 1, 2019

Related U.S. Application Data

(60) Provisional application No. 62/624,588, filed on Jan. 31, 2018.

(51) Int. Cl.
*H04N 9/79* (2006.01)
*H04N 9/87* (2006.01)
(Continued)

(52) U.S. Cl.
CPC ........... *H04N 9/7908* (2013.01); *G06T 5/007* (2013.01); *G11B 27/00* (2013.01); *H04N 5/20* (2013.01);
(Continued)

(58) Field of Classification Search
CPC ....... H04N 9/7908; H04N 7/0135; H04N 9/87
See application file for complete search history.

(56) References Cited

U.S. PATENT DOCUMENTS 5,596,510 A    1/1997  Boenke
5,809,181 A    9/1998  Metcalfe
(Continued)

FOREIGN PATENT DOCUMENTS

| CN | 104298459 A | 1/2015 |
| CN | 106488246 A | 3/2017 |
| WO | 2017129265 A1 | 8/2017 |

*Primary Examiner* — Thai Q Tran
*Assistant Examiner* — Sunghyoun Park

(57) ABSTRACT

The disclosure is directed to transforming signals from one signal format to another signal format. For example, the format of a digital signal can change from storing video information in 12 bits of data to storing the video information in 32 bits of data. Other storage values and combinations can also be used. Since the number of bits available to store a portion of the video information can change when changing formats, a process is needed to translate or transform the video information appropriately. A transfer function utilizing a lookup table is used for the transforming. The lookup table utilizes a variable step size segmentation scheme that decreases the amount of lookup table storage space required and also decreases the number of estimation errors, i.e., interpolation errors. Estimation errors can occur when looking up a value not stored in the lookup table, and using neighboring values that are stored to estimate the value requested. In some applications, the $\log_2$ step size or total size values can be stored in the lookup table to further reduce the amount of storage space required. A video parameter, such as the type of video content and the display room ambiance, can also be used to select the balance between further decreasing the size of the lookup table and further decreasing the estimation errors.

25 Claims, 7 Drawing Sheets

(51) Int. Cl.
*H04N 7/01* (2006.01)
*H04N 5/765* (2006.01)
*G11B 27/00* (2006.01)
*H04N 5/20* (2006.01)
*G06T 5/00* (2006.01)

(52) U.S. Cl.
CPC ............ *H04N 5/765* (2013.01); *H04N 7/0135* (2013.01); *H04N 9/79* (2013.01); *H04N 9/87* (2013.01)

(56) References Cited

U.S. PATENT DOCUMENTS

| | | | |
|---|---|---|---|
| 6,204,939 B1 | 3/2001 | Lin et al. | |
| 6,225,974 B1 | 5/2001 | Marsden et al. | |
| 6,323,969 B1 | 11/2001 | Shimizu et al. | |
| 6,421,140 B1 | 7/2002 | Hui | |
| 7,190,827 B2 | 3/2007 | Zeng et al. | |
| 7,348,994 B2 | 3/2008 | Nabeshima | |
| 8,294,953 B2 | 10/2012 | Shaw et al. | |
| 8,520,023 B2 | 8/2013 | Sullivan et al. | |
| 8,995,018 B1 | 3/2015 | Keithley | |
| 9,367,934 B2 | 6/2016 | Iwaki et al. | |
| 9,466,260 B2 | 10/2016 | Higgins | |
| 9,584,811 B2 | 2/2017 | Su | |
| 9,716,887 B2 | 7/2017 | Atkins et al. | |
| 2002/0011943 A1* | 1/2002 | Deeley | H04N 19/61 341/67 |
| 2005/0134612 A1* | 6/2005 | Kempf | G09G 3/2007 345/690 |
| 2006/0053020 A1* | 3/2006 | Chen | G10L 19/002 704/503 |
| 2006/0164430 A1* | 7/2006 | Tin | G09G 5/06 345/602 |
| 2007/0242320 A1* | 10/2007 | Horie | H04N 5/772 358/518 |
| 2008/0252657 A1 | 10/2008 | Watanabe | |
| 2008/0297662 A1* | 12/2008 | Gibbs | H04M 1/22 348/725 |
| 2012/0275511 A1* | 11/2012 | Shemer | H04N 19/59 375/240.02 |
| 2013/0147915 A1* | 6/2013 | Wiegand | H04N 19/159 348/43 |
| 2014/0225910 A1 | 8/2014 | Zeng et al. | |
| 2015/0026575 A1 | 1/2015 | Martin | |
| 2015/0109355 A1 | 4/2015 | Wang et al. | |
| 2015/0237374 A1* | 8/2015 | Huang | H04N 19/436 375/240.18 |
| 2015/0245050 A1* | 8/2015 | Tourapis | G09G 5/005 375/240.02 |
| 2016/0205372 A1 | 7/2016 | Liu et al. | |
| 2016/0322020 A1* | 11/2016 | Park | G09G 3/3696 |
| 2017/0026646 A1 | 1/2017 | Minoo et al. | |
| 2017/0048420 A1 | 2/2017 | Morovic et al. | |
| 2017/0061926 A1 | 3/2017 | Bhattacharjee | |
| 2017/0062005 A1* | 3/2017 | Kolesnikov | G11B 27/005 |
| 2018/0027262 A1* | 1/2018 | Reinhard | H04N 19/70 382/166 |
| 2018/0060278 A1* | 3/2018 | Lin | G06F 7/544 |

\* cited by examiner

TRANSFER OF VIDEO SIGNALS USING VARIABLE SEGMENTED LOOKUP TABLES

CROSS-REFERENCE TO RELATED APPLICATION

This application claims the benefit of U.S. Provisional Application Ser. No. 62/624,588, filed by Yanbo Sun, et al. on Jan. 31, 2018, entitled "METHOD AND APPARATUS FOR LOW COST, HIGH ACCURACY GAMMA CORRECTION," commonly assigned with this application and incorporated herein by reference in its entirety.

TECHNICAL FIELD

This application is directed, in general, to an EOTF/OETF implementation and, more specifically, to a video transfer function utilizing a lookup table.

BACKGROUND

In standard dynamic range video and display systems, a lookup table (LUT) is typically utilized to implement the gamma and inverse gamma transfer function. In video, as the color depth increases, the number of LUT entries also increases. For example, there are 256 entries in a LUT for an 8-bit color depth system and 1024 entries in a LUT for a 10-bit color depth system. To reduce the cost of implementing a LUT, the storage space for the LUT can be reduced. Typically, this can be implemented using a linear interpolation combined with the LUT. A 1024 entry LUT can be reduced to 257 entries when using a 2-bit linear interpolation.

In high dynamic range systems, a minimum of a 12 bit electrical signal and a 32 bit optical signal is required for high quality images and video pipelines. Lower quality images can use a lower number of bits in its signals. A full 4096 entry LUT to support the transfer function between these signals has a higher relative cost since the storage space required increases. Reducing the LUT using standard interpolation techniques can introduce user perceivable distortion in the video. A more efficient solution is needed to support the larger LUT entry tables without increasing the storage costs.

SUMMARY

In one aspect, the disclosure provides a method to adjust a video input in a processor. In one embodiment, the method includes: (1) receiving a video input, and (2) adjusting the video input, utilizing a transfer function employing a segmented lookup table (LUT), wherein the segmented LUT utilizes a variable segmentation step size.

In another aspect, the disclosure provides a video processing transfer function system. In one embodiment, the system includes: (1) a receiver, operable to receive a video input and video parameters, wherein the video parameters are determined from the video input and the video parameters are used for at least one of an electro-optical transform (EO), an optical-electro transform (OE), an electrical to electrical transform (EE), an optical to optical (OO) transform, or an inverse EO transform, (2) a storage, operable to store the video input, the video parameters, an adjusted video, and a LUT, and (3) a video processor, operable to generate the adjusted video by executing a transfer function on the video input, wherein the transfer function utilizes the LUT, and where the LUT utilizes a variable segmentation step size for a targeted range of LUT values, and where the variable segmentation step size is determined by said video parameters.

In yet another aspect, the disclosure provides a computer program product having a series of operating instructions stored on a non-transitory computer-readable medium that directs a data processing apparatus when executed thereby to perform operations to generate an adjusted video utilizing a segmented LUT. In one embodiment, the computer program product includes: (1) receiving a first video, (2) converting the first video to a second video, utilizing a transfer function employing the LUT, and wherein the segmented LUT utilizes a variable segmentation step size, and (3) generating said second video, utilizing said first video.

BRIEF DESCRIPTION

Reference is now made to the following descriptions taken in conjunction with the accompanying drawings, in which.

DETAILED DESCRIPTION

Figure 1:
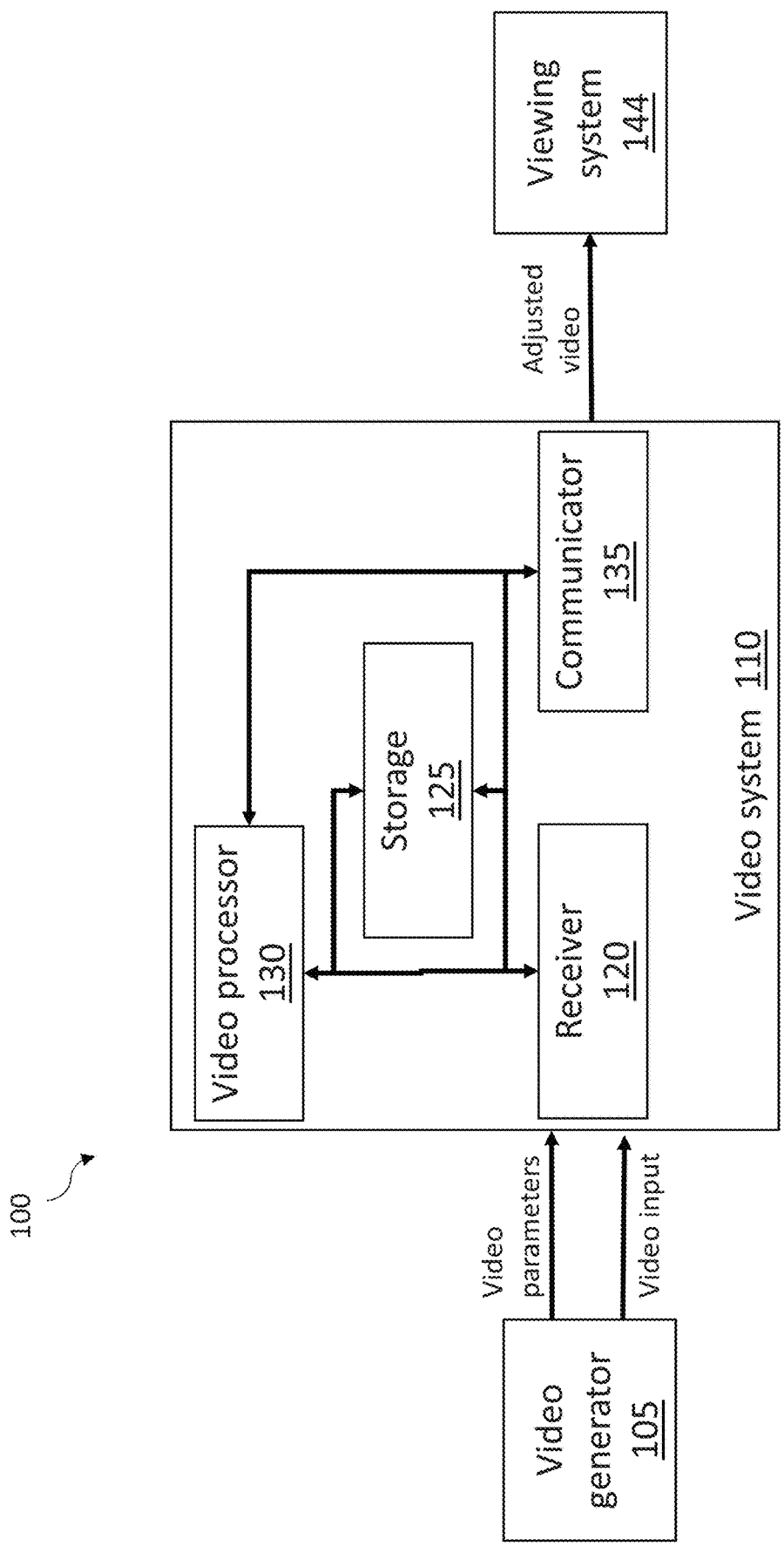
FIG. 1 is an illustration of a block diagram of an example video processing system to implement a video transfer function utilizing a lookup table (LUT)

Video can be played backed, i.e., displayed, on various viewing systems. For example, video can be displayed through a projector, on a liquid crystal display (LCD), an organic light emitting diode (OLED) display, a cathode ray tube (CRT) display, a plasma display, a system utilizing mirrors and reflectors, and other display types. When video is displayed on one of these various types of viewing systems, the exact replication of the video, as perceived by a user, may not occur, without adjustments. For example, when viewing an analog film strip of a video, the color, contrast, and other video characteristics are established by the physical film strip itself. The display variables can be the brightness of the bulb and the lens that is utilized.

When viewing a digital version of the same video, there are additional video characteristics that can be considered. For example, a CRT can interpret one way how to display a video pixel at 50% brightness, while an LCD can be configured for a slightly different display characteristic. Different models of the same type of viewing system, such as LCD monitors, can also be configured to interpret the video characteristics differently from each other. The reverse process can experience the same characteristic differences. For example, a camera capturing a video and transferring the video to a digital format.

To adjust for the varying characteristics of a video when the video is being transferred between systems or sub systems, a process, typically called a transfer function, is invoked. The transfer function can take a digital signal and transform that signal from its existing format, such as an electrical or optical signal, to a new format, such as an electrical or optical signal. For example, the format of the digital signal can change from storing the video information in 12 bits of data to storing the video information in 32 bits of data. Other storage values and combination can also be used. Since the number of bits available to store a portion of the video information can change when changing formats, a process is needed to translate or transform the video information appropriately. Typically, a lookup table is used for this purpose. A lookup table can be used to lookup a value for one digital signal format and find a corresponding value in a different digital signal format. The values found can be used in an algorithm, such as the transfer function, to enable a calculation to occur to determine the different digital signal format values for that video information.

As video and display technologies have improved, the size of the lookup table has also increased to handle the increase in the number of video characteristics that can be manipulated, such as the number of colors, luminescence (brightness), and other characteristics. The size of lookup tables have increased to a point where it is no longer efficient to store them where they need to be located in order to keep processing speed at an acceptable level. A way is needed to decrease the size of the lookup table without degrading the video, as perceived by a user, i.e., visual artifacts, coloration differences, shading differences, and other artifacts. One way is to remove some values from the lookup table, such as removing 3 out of every 4 values.

When the transfer function needs a value that has been removed from the lookup table, the transfer function can use the two neighboring values of the value that is missing and estimate, i.e., interpolate, a value for the missing value. If the two neighboring values follow a linear path (if plotted on a chart), then the interpolated value would be a close enough approximation to the actual value so that a visual artifact would not be introduced. If the two neighboring values follow a curved path, then the interpolated value may or may not be a close enough approximation to the actual value. A user perceivable visual artifact can be introduced into the video if the interpolated value is too far from the actual value.

To decrease the error between the interpolated value and the actual value stored in the lookup table, a smaller number of values, i.e., step size, can be removed from the lookup table, such as 2 values instead of 3 values. This disclosure demonstrates the use of a variable step size lookup table, where some segments of the table can use a step size that is different than the step sizes used in other segments of the lookup table. By adjusting the step sizes across two or more segments of the lookup table, a balance can be made between decreasing the size of the lookup table and maintaining a target level of video quality, i.e., minimizing visual artifacts to a point where a user may not notice the visual artifact. Some visual artifacts can be acceptable, as long as the overall video quality at least meets a targeted quality level.

One type of the video characteristics can be the gamma correction. In the industry, this is generally referred to as the electro-optical transfer function (EOTF) or the optical-electro transfer function (OETF), depending on the direction of the video signal. As used herein, gamma correction includes the EOTF and OETF, and other transfer functions, such as inverse EOTF, electrical to electrical transfer function (EETF), optical to optical transfer function (OOTF), an inverse gamma, and digital imaging system transfer functions. OETF is typically the OOTF multiplied by the inverse EOTF. In cases where the optical to optical transfer is a one to one ratio, then the OETF equals the inverse EOTF. The gamma curve can be adjustable so that the transfer from the video input to the video output can reflect a determined viewing experience. A low gamma, with a shallow curve, can result in a more satisfactory user viewing experience when viewing the video in a bright room and when viewing application content on a viewing system, e.g., a word processor. A higher gamma, with a deeper curve, can result in darker shadows that can result in a better viewing experience in a darker room and when viewing movies.

Video systems can take as input, a video source and video parameters associated with that video source. The video parameters can include various factors, such as, the nature or type of video being viewed, the viewing system or video output system that is being used, the ambient characteristics of the space where the video is being displayed or captured, where the user is located, and other factors. For example, watching an action movie on an LCD at home in a darkened room can have a specified set of video parameters and can have a unique set of configuration values for use in the gamma transfer functions. Watching a news program in a brightly lit conference room can have a different set of video parameters. A simple gamma transfer example can be a video that has a value of 0.0 representing complete darkness and 1.0 representing full brightness. A video can pass a half brightness value of 0.5 to a viewing system. The viewing system can have half brightness configured as 0.735. Displaying a pixel of the video at 0.5, therefore, would display that pixel darker than the video input intended. In an alternative, users can select some of the video parameters, for example, a user can select a view option, such as movie, sitcom, nature, and other types of view options. The video parameters associated with the view option selected can be applied to the video parameters sent to the video processing system.

The gamma transfer function can be used to transfer, i.e., convert, a video input, i.e., a first video, to a video output, i.e., a second video. A video input can be from video generator. The video generator can retrieve existing digital video, such as from a storage medium, cloud service, data center, hard drive, optical media, intranet, internet, and other sources. The video generator can modify and create video as well, such as utilizing a computing system and a video processor. The video input, in this scenario, is a linear electrical signal. In terms of the gamma transfer functions, the linear electrical signal can represent the luminescence of the video. The video output can be intended for a viewing system, such as an LCD. The video output, in this scenario, is a non-linear optical signal. In terms of the gamma transfer functions, the non-linear optical signal can represent the voltage of the signal. The reverse system configuration is also applicable. The video input can be a non-linear optical signal, such as from a camera. The video output can be a linear electrical signal, such as for a computing system.

The video system, when transforming a video from an electrical to optical signal or optical to electrical signal, can take the video input and adjust the video to better represent the original video characteristics compared to a non-adjusted video. In order to achieve the video transformation at a rate fast enough to maintain a targeted level of frames per second (FPS), a lookup table (LUT) can be utilized to provide values to be used by various transformation functions, such as the EOTF, inverse EOTF, OETF, EETF, OOTF, gamma, inverse gamma, digital imaging transfer functions. As viewing systems have advanced in capability, the amount of space required to store the LUT has increased. High dynamic range (HDR) systems require additional storage space than a standard dynamic range (SDR) system. For example, some HDR systems use a 12, 16, or higher bit dynamic range, compared to some SDR systems using an 8-bit dynamic range. For example, a LUT that supports an EOTF can have 4096 entries to support a 12-bit electrical signal for a video input. Each entry in the LUT can store a 28-bit or a 32-bit optical signal for the adjusted video. This can result in a storage cost of 16,384 bytes for the 32-bit optical signal. The cost of the extra storage space required for the LUT can increase as the LUT size increases. This cost can also increase when multiple LUTs are required to be loaded to support transfer functions for multiple communicatively coupled systems. In addition, the processing time to scan through the LUT to find the indexed values increases as the size of the table increases.

A solution can be to reduce the LUT size by discarding entries using a pattern, such as 3 out of every 4 entries discarded. Interpolation, using the neighboring values, can be utilized to fill in the missing entries. This solution can introduce visual artifacts and distortion in the video that are perceptible by a user.

Some solutions can have a segmented LUT, where each segment is of a pre-determined or equal step size. Applying a transfer function to a video using a LUT of this type can result in the introduction of visual artifacts and distortion. In portions of the video's gamma curve that are deeply or highly curved, the distance between the targeted gamma curve and the interpolated values provided by the LUT can be large. This distance is the error deviation value. At a certain error deviation value, a user can perceive the visual distortion. The error deviation value can vary depending on the systems used, the video being displayed or captured, and the user's visual capability and preference.

This disclosure introduces a way of reducing the size of the LUT through the utilization of a variable step size in its segmentation, thereby lowering the storage cost of the LUT and lowering the scan time of the LUT. In addition, the variable step size segmented LUT can provide a higher user visual satisfaction, in that fewer visual distortions can be apparent to the user, by maintaining a maximum or better targeted level of error distortion.

The LUT can be divided into various segments, where the size of each segment is independent of the other segments. The segments can be determined by approximating a best fit gamma correction curve on the video input. The best fit curve can be determined from the video parameters. The LUT segments can be re-divided, i.e., recomputed, as the video input and the video parameters change over time. In order to utilize the segmented LUT, a segment index table is used to provide indirect indexing into the segmented LUT. The indirect indexing can introduce additional compute cycles to perform the two step index referencing. Even with the additional compute cycles, the overall video processing system cost can be lower than using a non-segmented LUT.

An alternative aspect can utilize a variable step size LUT with the addition of a spline interpolation. A spline polynomial curve can be represented between neighboring entries of the LUT. By applying a polynomial curve, the step size in a particular segment can be larger, thereby further reducing the size needed to store the LUT entries. Multiple variables can be used to describe the polynomial and additional compute cycles can be utilized to complete the spline interpolation algorithm on the polynomial variables. This alterative can reduce the size of the LUT and increase the number of compute cycles to complete the transfer function algorithm on the video input. In addition, in a multiple LUT aspect, a direct LUT mode may be difficult to implement with a spline interpolation mode.

The variable segmented LUT can be stored in various types of storage mediums. For example, the LUT can be stored in a register or set of registers, local cache of the processor, global cache, random access memory, and other memory locations. The video processor that applies the transfer function can be various types of processors, or part of other processors. For example, the video processor can be a graphics processing unit, a central processing unit, and another type of processing unit. In addition, the video processor can be part of another processor or system. For example, the video processor can be part of a computing system, such as a server, it can be part of the viewing system, such as a monitor and smartphone display, and it can be part of a video capture system, such as a digital camera. In an alternative, the video processor can be implemented as software to be executed as an application on a computing system.

Gamma corrections can be implemented using a transfer function. For example, one transfer function to transform a video to an adjusted video for the targeted viewing system can be represented by formula 1:

Formula 1: SDR Transfer Function Example, Transforming to an Optical Signal $$f(x) = \begin{cases} \dfrac{x}{12.92} & x \le 0.04045 \\ \left(\dfrac{x+0.055}{1.055}\right)^{2.4} & x > 0.04045 \end{cases}$$

Formula 1 is a transfer function that results in a value in the range of 0.0 to 1.0. If an integer value in the range of 0 to 255 is needed for the viewing system, such as with an 8-bit viewing system, then the result can be multiplied by 255 and rounded to the nearest integer. The inverse gamma transfer function can be represented by formula 2. This can transform a video from an optical signal to an electrical signal, for example, video captured by a digital camera.

Formula 2: SDR Transfer Function Example, Transforming to an Electrical Signal $$f(x) = \begin{cases} 12.92 * x, & x \le 0.0031308 \\ 1.055 * x^{\frac{1}{2.4}} - 0.055, & x \ge 0.0031308 \end{cases}$$

For high definition televisions, the typical transfer functions can be represented by formula 3, which is an example of transforming a video from an electrical signal to an optical signal for a viewing system, and formula 4, which is an example of transforming a video input from an optical signal to an electrical signal.

Formula 3: Electrical to Optical Transfer Function Example $$f(x) = \begin{cases} \dfrac{x}{4.5} & x < 0.081 \\ \left(\dfrac{x+0.099}{1.099}\right)^{\frac{1}{0.45}} & x \ge 0.081 \end{cases}$$

Formula 4: Optical to Electrical Transfer Function Example $$f(x) = \begin{cases} 4.500 * x & x < 0.018 \\ 1.099 * x^{0.45} - 0.099 & x \geq 0.018 \end{cases}$$

In another aspect, other transfer functions can be utilized, such as the HDR PQ (also known as SMPTE 2084). HDR PQ can provide an efficient transformation of HDR video. In addition, EOTF, inverse EOTF, OETF, and other types can be utilized. Formula 5 is an example of an EOTF. Formula 6 is an example of an inverse EOTF Formula 5: EOTF Example $$f(x) = \left( \frac{\max\left[(x^{1/m2} - c1), 0\right]}{c2 - c3 * x^{1/m2}} \right)^{1/m1}$$

where x is a pixel value in the video input, and $$m1 = \frac{2610}{4096 * 4} = 0.15930175$$

$$m2 = \frac{2523 * 128}{4096} = 78.84375$$

$$c1 = \frac{3424}{4096} = 0.8359375$$

$$c2 = \frac{2413 * 32}{4096} = 18.8515625$$

$$c3 = \frac{2392 * 32}{4096} = 18.6875$$

Formula 6: Inverse EOTF Example $$f(x) = \left( \frac{c1 + c2 * x^{m1}}{1 + c3 * x^{m1}} \right)^{m2}$$

where x is a pixel value in the video input, and $$m1 = \frac{2610}{4096 * 4} = 0.15930175$$

$$m2 = \frac{2523 * 128}{4096} = 78.84375$$

$$c1 = \frac{3424}{4096} = 0.8359375$$

$$c2 = \frac{2413 * 32}{4096} = 18.8515625$$

$$c3 = \frac{2392 * 32}{4096} = 18.6875$$

An example method of segmenting an EOTF, inverse EOTF, and OETF to generate variable step size LUTs can be represented. For an example EOTF that converts an input electrical signal value ranging from 0 to 4095, i.e., 12-bits, to an optical signal value, the transfer function can be divided into 64 segments as shown in table 1.

TABLE 1

EOTF segmentation example

| Segment number | Corresponding input electrical signal value range |
| --- | --- |
| 0 | 0x000-0x03F |
| 1 | 0x040-0x07F |
| 2 | 0x080-0x0BF |
| . | |
| . | |
| . | |
| 62 | 0xF80-0xFBF |
| 63 | 0xFC0-0xFFF |

For a given input electrical signal value x, the segment number corresponding to input value x can then be computed using formula 7.

Formula 7: EOTF Transfer Function Example $$\text{segment\_number} = \text{floor}\left(\frac{x}{\text{segment\_size}}\right)$$

where segment_size=4096/64 segments.

A different step size can be selected for each segment so that the interpolated values of $f(x)$ in each segment do not generate user perceptible errors or exceed a targeted error deviation value.

The Inverse EOTF and OETF can convert an input optical signal value ranging, for example, from 0 to 0xFFFFFFFF, i.e., 32-bits, to an electrical signal value. The transfer function can utilize 32 unequal segments. In this example, segmentation process can utilize a $\log_2$ of the input values to reduce the size of the LUT. The segmentation is shown by example in table 2.

TABLE 2

OETF segmentation example

| Segment number | Corresponding electrical signal value range |
| --- | --- |
| 0 | 0x0000,0000-0x0000,0001 |
| 1 | 0x0000,0002-0x0000,0003 |
| 2 | 0x0000,0004-0x0000,0007 |
| 3 | 0x0000,0008-0x0000,000F |
| . | |
| . | |
| . | |
| 30 | 0x7000,0000-0x7FFF,FFFF |
| 31 | 0x8000,0000-0xFFFF,FFFF |

For a given electrical signal value x, the segment number corresponding to value x can be computed using formula 8.

Formula 8: Inverse EOTF Transfer Function Example $$\text{segment\_number} = \text{floor}(\log_2 x)$$

As described previously, a different step size can be selected for each segment so that the interpolated values of $f(x)$ in each segment do not generate user perceptible errors or exceed a targeted error deviation value.

Turning now to the figures, FIG. 1 is an illustration of a block diagram of an example video processing system 100 to implement a video transfer function utilizing a LUT. Video processing system 100 includes a video generator 105, a video system 110, and a viewing system 144. Video system 110 includes a receiver 120, a storage 125, a video processor 130, and a communicator 135, each communicatively coupled to the other.

Video generator 105 can be a video processor, video renderer, and a local storage medium, such as a memory, hard drive, server, portable memory stick, CD, DVD, and other storage mediums. In an alternative aspect, video generator 105 can be located a distance from video system 110, for example, a data center, cloud environment, and other location separate from the video system. The video generator 105 can be part of a computing system or part of a display system, such as a monitor. Video generator 105 is the source of the video input for the video system 110. The video provided to video system 110 can be rendered by a video processing system, be recorded separately from the video processing system, or a combination of these types of video can be used. The video input is supplied by the video generator 105 to the video system 110. The video generator 105 can also provide the optional video parameters, determined from the video input.

Receiver 120 of the video system 110 is capable of receiving the video input and video parameters, if the video parameters are present. The receiver 120 can store the video input and video parameters in the storage 125 and provide them directly to the video processor 130. Storage 125 can be various storage mediums, such as processor registers, cache memory, local memory, and other storage mediums.

Video processor 130 can generate the video parameters utilizing the video input, if the video parameters were not received by receiver 120. Video processor 130 can also modify the video parameters, utilizing the video input. Video processor 130 can utilize the video input and video parameters to segment and load a LUT and to select a LUT if it is already segmented and loaded. Video processor 130 can then apply a transfer function, utilizing the LUT, to the video input to generate an adjusted video. The adjusted video can be stored in storage 125 and transmitted directly to other systems. Video processor 130 can then indicate to the communicator 135 that the adjusted video, whether from the video processor 130 or storage 125, can be transmitted to a viewing system, 144. Viewing system 144 can be a display, such as a computer monitor, smartphone screen, VR display, and other types of viewing systems.

Video system 110 can be one or more processors and chips, and be part of another processing system. Video system 110 can be part of a computing system and it can be part of a viewing system, such as viewing system 144. Video system 110 can be a graphics processing unit, central processing unit, and other processing systems.

Video processing system 100 is an example of a video input transforming from an electrical signal to an optical signal. In an alternative aspect, the reverse process can be applied. In the reverse process, the video generator 105 can be a video capture system, such as on a digital camera. The viewing system 144 can be replaced by a digital storage system capable of storing the electrical signal form of the adjusted video, such as a hard drive, memory, cache, CD, DVD, memory stick, cloud storage, data center storage, server, and other storage mediums.

Figure 2B:
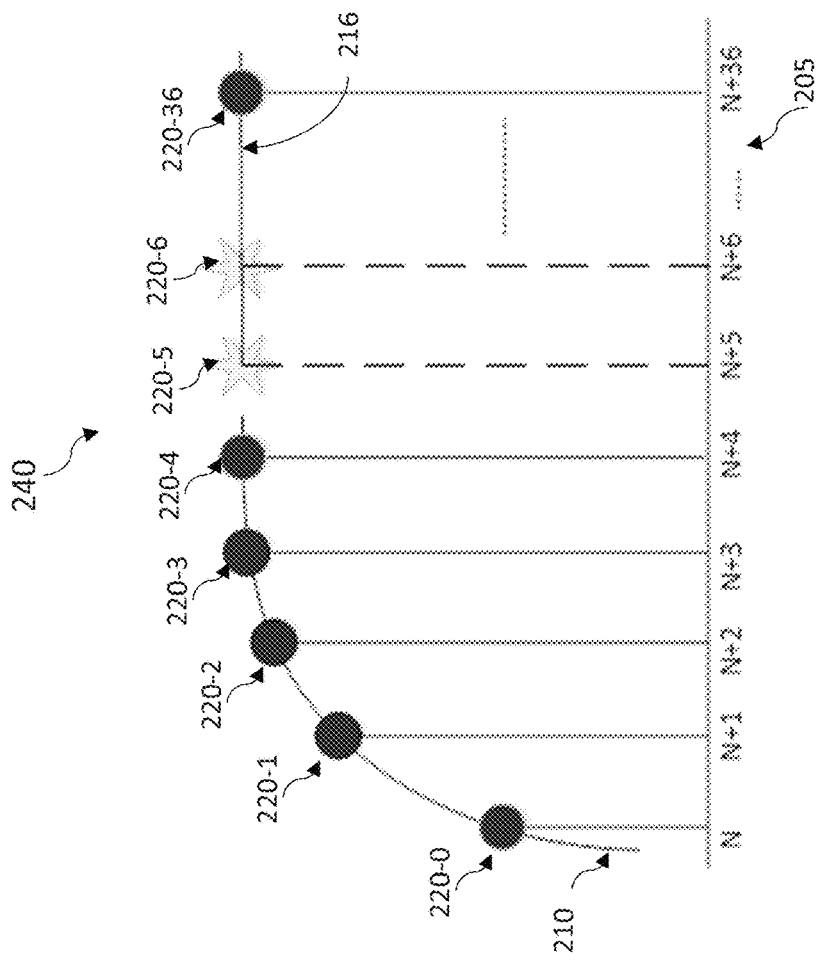
FIG. 2B is an illustration of a diagram of an example chart demonstrating a LUT utilizing a minimal error deviation.
Figure 2A:
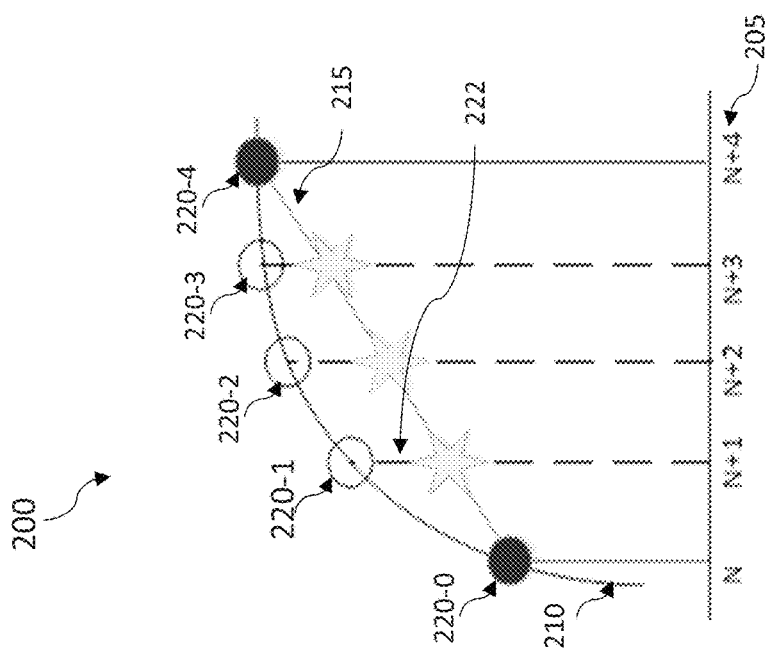
FIG. 2A is an illustration of a diagram of an example chart demonstrating a LUT utilizing an error deviation larger than a determined target error deviation.

FIG. 2A is an illustration of a diagram of an example chart 200 demonstrating a LUT utilizing an error deviation larger than a determined target error deviation. Chart 200 has an x-axis 205 showing sequential gamma curve points, starting at an arbitrary point 'N'. Curve 210 is the targeted gamma curve for a video input modified by video parameters. Points 220-$x$ are the points on the gamma curve 210 that intersect with the x-axis points 205. The y-axis, not shown, is the relative value to use in the transfer function for that pixel of the video input. Chart 200 is a demonstration of how the points on a gamma curve can be identified. In an implementation, the sampling point distances can vary in size.

Chart 200 shows two points, 220-0 and 220-4 as solid circles. Points 220-0 and 220-4 can be stored in a LUT. Points 220-1, 220-2, and 220-3 are not present in the LUT. Their transfer factor value can be interpolated from the points 220-0 and 220-4. The interpolation line is shown as line 215. The interpolation line 215 can be determined, for example, using formula 9 provided below. In some aspects, hardware instructions can be utilized to increase the speed and efficiency of formula 9.

Formula 9: Interpolation Line Transfer Function Example Using Points 220-0 and 220-4

$$f(x) \approx \text{lerp}(N+1) = f(N) * (1-\alpha) + f(N+4) * \alpha$$

where $\alpha = (N+1-N)/4$

The linear interpolation of a value is equal to the first known neighbor entry multiplied by a weighted value of how close the entry being analyzed is to the first known neighbor entry, then adding the second known neighbor entry multiplied by a weighted value. The weighted value is the relative distance of the analyzed value to the first known neighbor entry. The linear interpolation will introduce an error deviation value. The size of the error deviation value can depend on the linearity of the transfer function for the segment and the step size of the segment.

Chart 200 demonstrates the error deviation 222. The error deviation is shown as the distance between the gamma curve 210 and the interpolation line 215. There is a targeted error deviation value where values that exceed this target can be perceived by, or be detrimental to the visual experience of, a user. Chart 200 is demonstrating that existing LUT reduction techniques can create areas of the video that can exceed the targeted error deviation value.

FIG. 2B is an illustration of a diagram of an example chart 240 demonstrating a LUT utilizing a minimal error deviation. Chart 240 is similar to chart 200. In chart 240, gamma curve 210 is the same as interpolation line 216. Chart 240 is demonstrating a variable step size in the segmentation of the LUT. Points 220-0 through 220-4 utilize a step size of 1. Due to the sharp curve of gamma curve 210 through this portion of the chart, the step size of 1 minimizes the error deviation in the adjusted video. Points 220-4 through point 220-36 utilize a step size of 32. The gamma curve 210 is substantially a straight line in this portion of chart 240 so interpolation works well on the intervening points, such as 220-5 and 220-6. Chart 240 is demonstrating that 6 LUT entries can be utilized to represent 32 lookup values. The error deviation value is minimized as there is no gap between the gamma curve 210 and the interpolation line 216. Chart 240 is demonstrating a simple gamma curve and a few relative points (pixels of the video). An implementation can have a more complex gamma curve with significantly more points being considered. Multiple step sizes across multiple segments of the curve can be represented by matching segments of the LUT to a targeted step size.

Figure 2C:
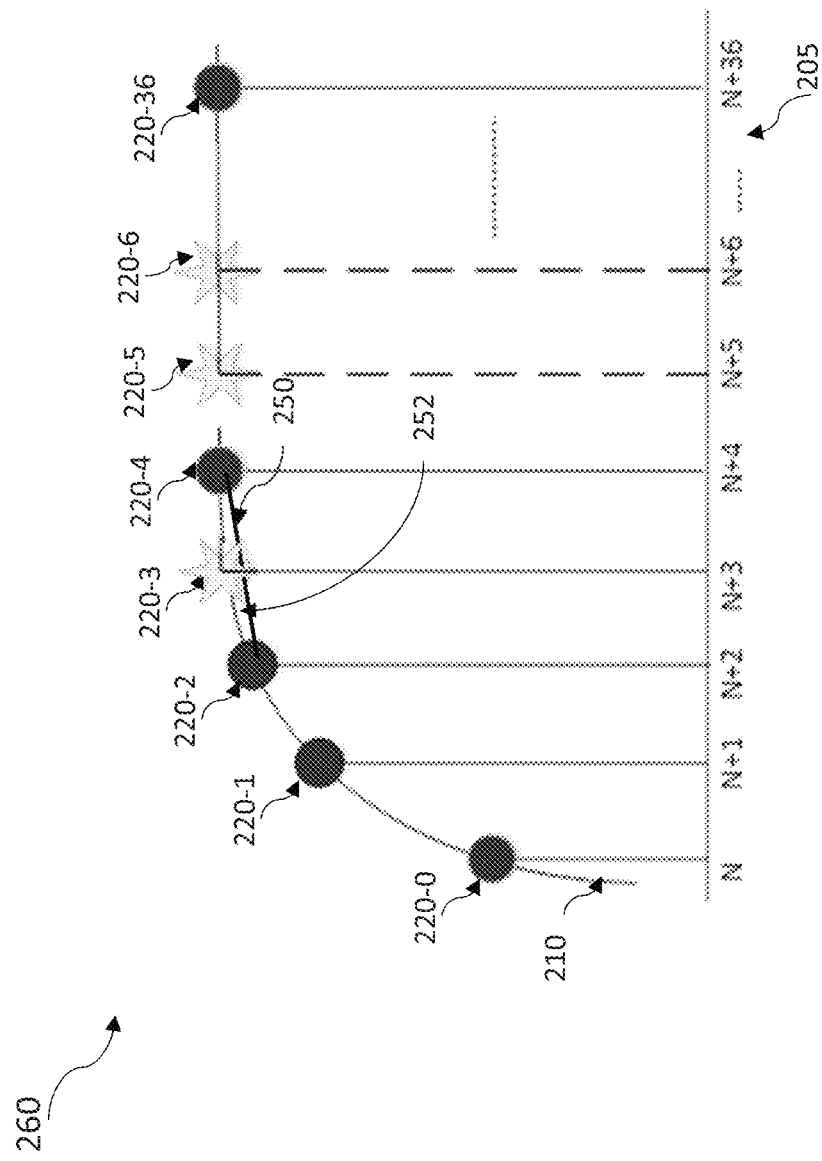
FIG. 2C is an illustration of a diagram of an example chart demonstrating a LUT utilizing an error deviation at a determined target error deviation.

FIG. 2C is an illustration of a diagram of an example chart 260 demonstrating a LUT utilizing an error deviation at a determined target error deviation. Chart 260 is similar to charts 200 and 240. Chart 260 is demonstrating an acceptable error deviation value. Point 220-3 has been removed from the LUT. The segment step size for this portion is 2. The interpolation line 250 is used for the value of point 220-3. Interpolation line 250 is the interpolation of points 220-2 and 220-4. The error deviation value 252 is within a targeted deviation value. Chart 260 is demonstrating a variable LUT step size of 1, 2, and 32, in different portions, or segments, of the gamma curve, for example, between points 220-0 and 220-1 is a step size of 1, between points 220-2 and 220-4 is a step size of 2, and between points 220-4 and 220-36 is a step size of 32. The algorithm used to determine the variable step size can utilize the targeted error deviation value, the video input, and the video parameters to balance generating a reduced entry LUT with generating a user acceptable adjusted video.

Figure 3:
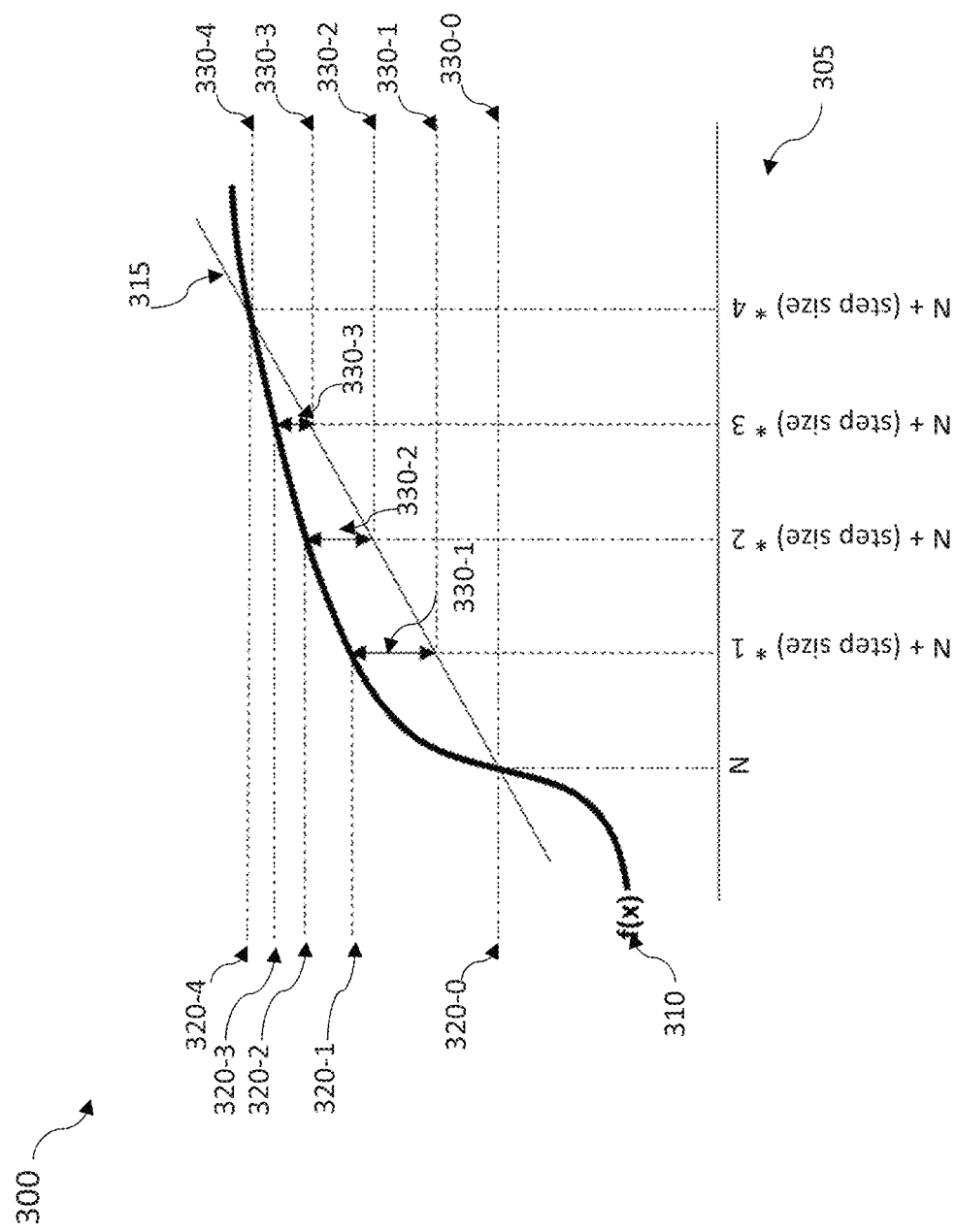
FIG. 3 is an illustration of a diagram of an example chart demonstrating different error deviations between a requested value and a transfer function value.

FIG. 3 is an illustration of a diagram of an example chart 300 demonstrating different error deviations between a requested value and a gamma curve. Chart 300 is demonstrating a more complex gamma curve $f(x)$ 310. X-axis 305 is showing an equal step size for each segment. Lines 320-$x$ show the intersection points on the curve 310 of the various gamma curve input x values on x-axis 305. Lines 330-$x$ show the intersection points on the best fit interpolation line 315 of the various transfer function input x values on x-axis 305. Error deviations 330-$x$ are pointing to the error deviations that need to be accounted for in the determining the variable step size segmentation process. For example, error deviation 330-3 can be within the targeted error deviation value and error deviation 330-2 can be at the targeted error deviation value. No change to the step size would be needed for these two points. If error deviation 330-1 is larger than the targeted error deviation, then the algorithm can reduce the step size in this segment of the curve 310 so that the interpolation line 315 moves closer to the curve 310, thus reducing the error deviation 330-1 to an acceptable target value.

Figure 4:
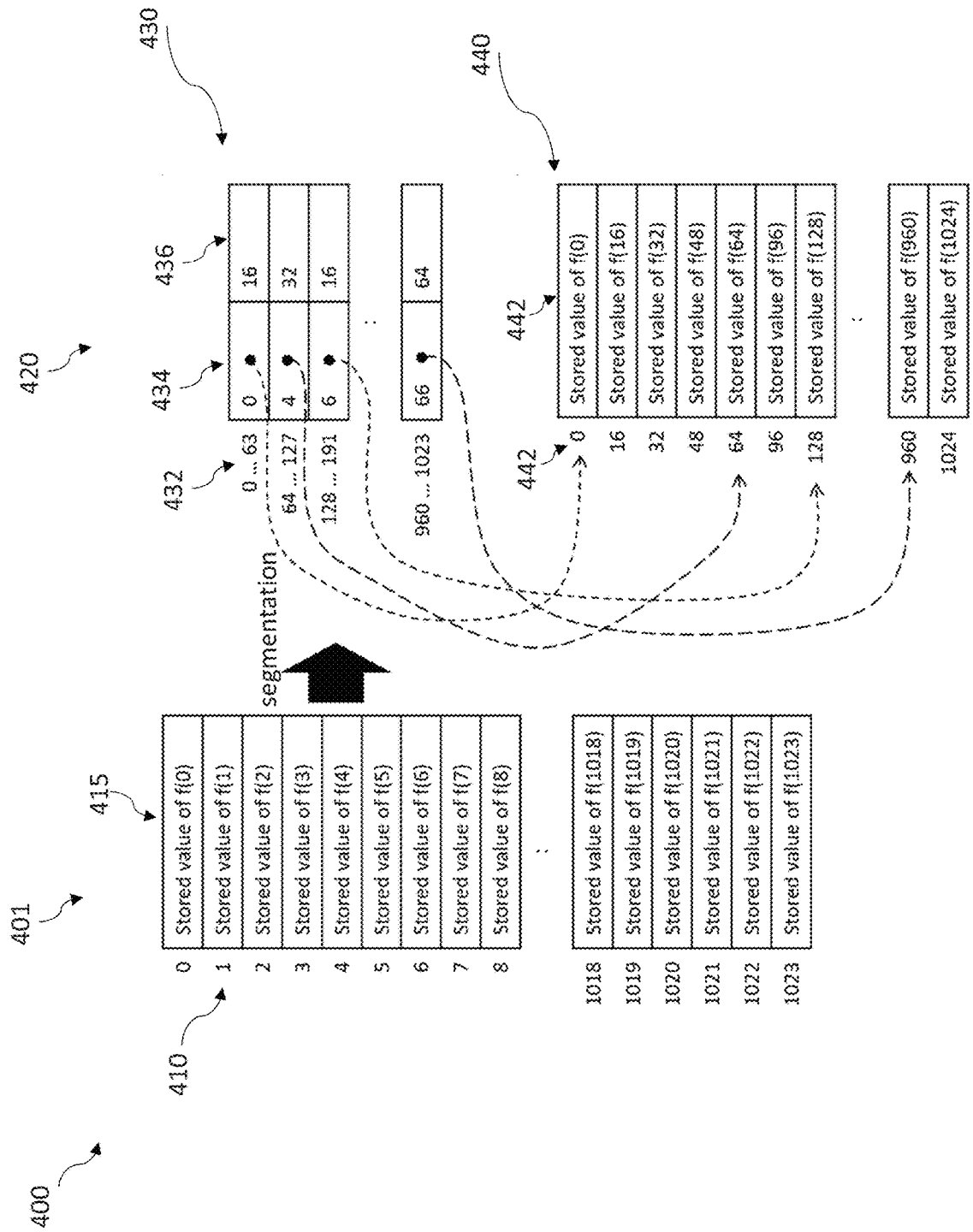
FIG. 4 is an illustration of a block diagram of an example implementation of a LUT demonstrating a variable segmentation.

FIG. 4 is an illustration of a block diagram of an example implementation of a LUT 400 demonstrating a variable segmentation. LUT 400 can originate as a table 401, having an index 410 and a transfer function value 415. The index 410 is shown in sequential order. The order of the index 410 can be in various sequences. After analyzing the video input and video parameters, the LUT can be segmented as shown in table set 420. Table 430 is a segment index table. Table 430 has an index range 432, a segment start value 434, and a segment step size 436. For example, indices 0-63 utilize a step size of 16 and indices 960-1023 utilize a step size of 64. A larger step size can be utilized in segments of the transfer function that are relatively linear and smaller step sizes can be utilized in segments of the transfer function that are less linear.

In an alternative aspect, if the step sizes in all of the segments are powers of 2, the table 430 can be reduced to store $\log_2$ of the step sizes to further reduce the number of bits to store the table 430. A second table is the reference LUT 440. Reference LUT 440 has an index 442 and a stored transfer function value 444. In this example, for indices between 0 and 63, there can be one entry in the LUT for every 16 entries in the original LUT. For indices between 960 and 1023, there can be one entry in the LUT for every 64 entries in the original LUT.

Transfer function $f(x)$ can be determined by examining the segment index table 430 to determine which segment the input value of x lies and the step size for that segment. The start index of the segment is also identified. The reference LUT 440 is then examined, starting at the start index and assuming a uniform step size as identified until the correct index is found, or until the two neighboring indices are found if the specific value of x is removed. If the specific index is found, then the value of x is used in the transfer function. If the index is not found, than an interpolation algorithm is applied to the neighboring indices and the result of the interpolation is utilized in the transfer function. This algorithm provides for a variable LUT step size where the LUT is reduced in size, and with the compute cycle adding a minimal increase due to the two references.

The LUT offsets for table 430 can be calculated, for example, using listing 1. Listing 1 is presented using a C language construct for demonstration. The implementation of the algorithm can use one or more computing languages, such as assembly, python, C, Verilog, VHDL, and other languages.

Listing 1: Segment index offset calculation example

```
segment_offset[0] = 0;
for (i = 0; i < number_of_segments; i++) {
    segments_offset[i+1] = segments_offset[i] + total_step[i];
}
```

For an input of x, i.e., a video input pixel or point, the process can determine the segment, index 'i' and retrieve the step size from the total_step[i], i.e., the information from table 430. The segment index can be determined using, for example, formula 10. In an alternative aspect, when the LUT is further reduced by using the $\log_2$ function, formula 11 can represent the segment index calculation.

Formula 10: Segment Index Calculation Example $$i = \frac{x}{\text{segment\_size}}$$

Formula 11: Segment Index Calculation Example, Using a $\log_2$ Function $$i = \log_2 x$$

A generalized calculation algorithm can be demonstrated by example formula 12 and example formula 13. Formula 12 can be used to calculate a LUT base address. Formula 13 can be used to calculate the linear interpolation. Example formula 14 can be used to demonstrate the calculation for the transfer function $f(x)$. Formulae 12, 13, and 14 are example algorithms and other algorithms can be used to accomplish a similar result. Formula 15 demonstrates a relationship between the segment size, step size, and total size parameters.

Formula 12: Generalized LUT Base Index Address Algorithm Example $$N = \text{segment\_offset}(i) + \text{floor}((x - \text{segment\_start}(i))/\text{step\_size}[i])$$

Formula 13: Generalized Linear Interpolation Algorithm Example $$\alpha = 1 - \text{modulus}(x - \text{segment\_start}(i), \text{step\_size}[i])/\text{step\_size}[i]$$

Formula 14: Generalized Transfer Function Algorithm Example $$f(x) \approx \text{lerp}(x) = \text{LUT}(N) * (1-\alpha) + \text{LUT}(N+1) * \alpha$$

Formula 15: Relationship Between Segment_Size, Step_Size and Total_Step $$\text{step\_size}(i) * \text{total\_step}(i) = \text{segment\_size}$$

The values total_step(i), step_size(i) or their respective $\log_2$ values can be stored in the LUT. By selecting a segment_size and a total_step(i) that are powers of 2 can simplify hardware implementation without using dividers.

Figure 5:
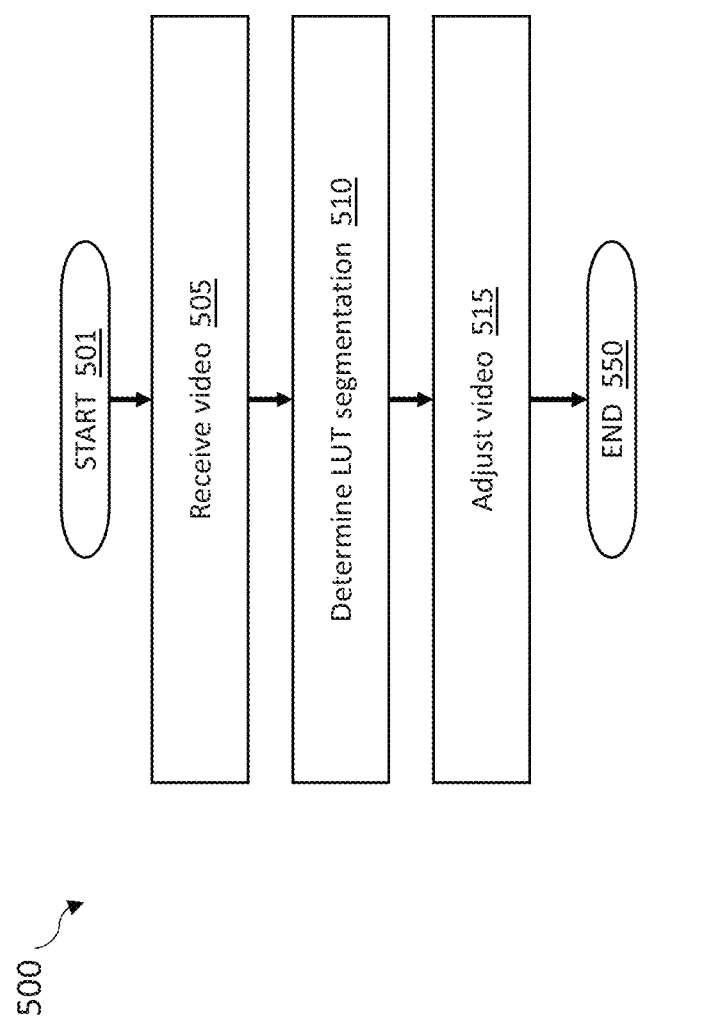
FIG. 5 is an illustration of a flow diagram of an example method to utilize a variable segmented LUT.

FIG. 5 is an illustration of a flow diagram of an example method 500 utilizing a variable segmented LUT. Method 500 begins at a step 501 and proceeds to a step 505. In the step 505, a video input is received. The video input can be received from a video processing system, a storage system, a camera capture system, and other systems. The video can be captured video, rendered video, and a combination of video types. Proceeding to a step 510, LUT segmentation is determined. Determining the LUT segmentation can include determining an algorithm to utilize for segmenting the LUT. The video input can be analyzed by the processor to determine the segment step size for each segment of the gamma curve being applied to the video input.

Proceeding to a step 515, the video input is adjusted by applying a transfer function to the video input. The transfer function can utilize the LUT to reference transfer function values stored in the LUT. The LUT can utilize a variable segment step size. The method 500 ends at a step 550.

Figure 6:
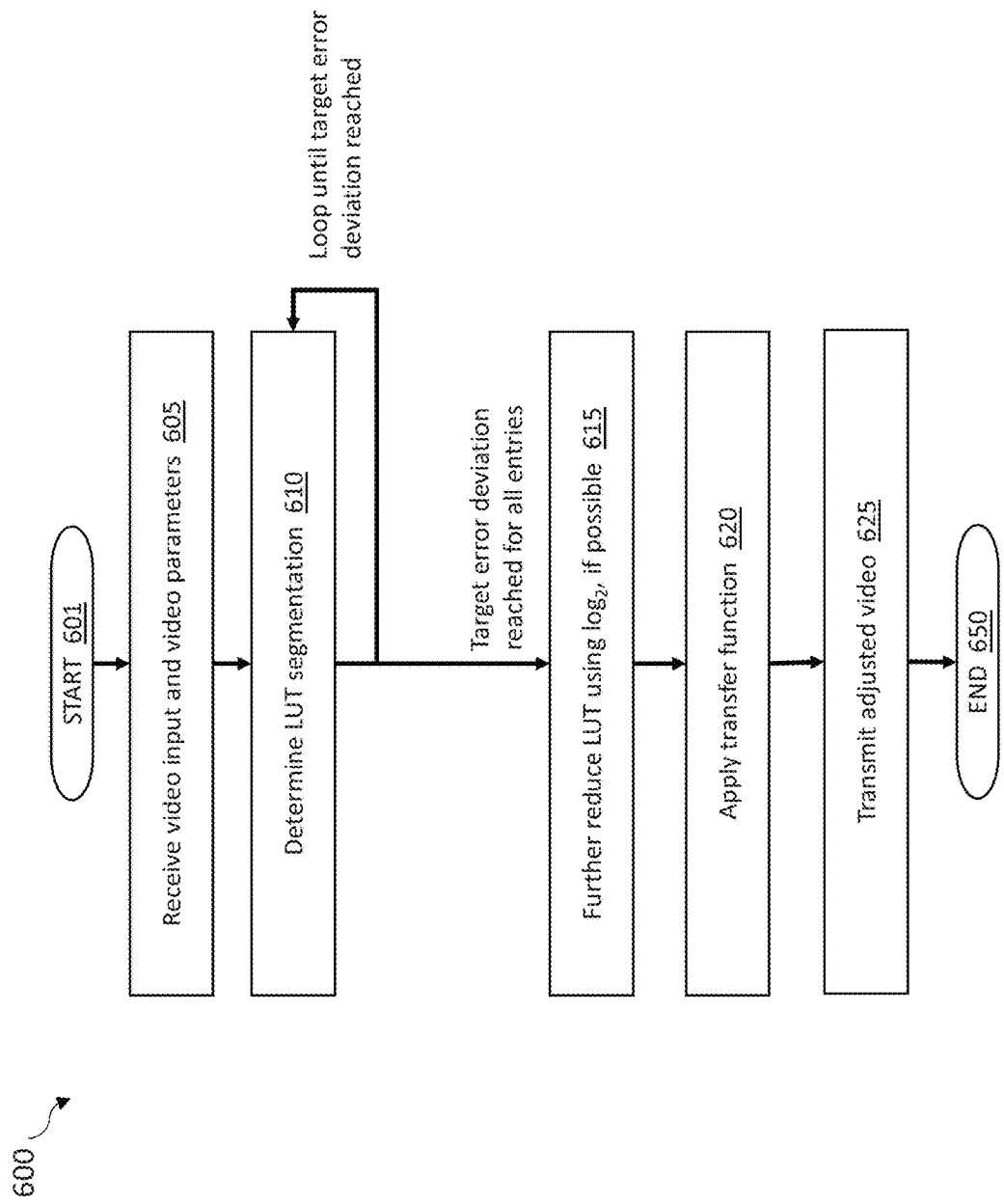
FIG. 6 is an illustration of a flow diagram of an example method, where the variable segmentation utilizes a determined target error deviation.

FIG. 6 is an illustration of a flow diagram of an example method 600 where the variable segmentation utilizes a determined target error deviation. Method 600 begins at a step 601 and proceeds to a step 605. In the step 605, a video input is received. In addition, video parameters are received. The video parameters relate to the video input and can provide additional information on how the video is to be transformed, such as providing the targeted system configuration parameters, the video input content style (i.e., movie, news, nature), location parameters (i.e., ambient lighting), user preferences, and a target error deviation value.

Proceeding to a step 610, segmentation of the LUT can be determined utilizing the video input and the video parameters. It is possible that step 610 can be implemented recursively or in a loop as represented in FIG. 6. Once the segmentation is determined, if an error deviation value, as determined from the gamma curve and the interpolation line, is found to exceed the target error deviation value, the segment step size for that portion of the LUT can be reduced in step size. The reduction in step size can reduce the error deviation value to a point where the target error deviation value is met or better. Once the target error deviation value is satisfied, the method 600 proceeds to a step 615.

In a step 615, the LUT can be further reduced in size by applying an algorithm, such as a $log_2$ algorithm if the step sizes are all powers of 2. In alternative aspects, other algorithms can be applied for size reduction. Proceeding to a step 620, the transfer function can be applied to the video input, utilizing the variable step size segmented LUT to generate an adjusted video. Proceeding to a step 625, the adjusted video can be transmitted to processors, systems, storage mediums, viewing systems, and other targeted locations. The method 600 ends at a step 650.

The above-described apparatuses, systems or methods or at least a portion thereof may be embodied in or performed by various processors, such as digital data processors or computers, including cloud computing systems and servers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers, including cloud computing systems and servers, to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method to adjust a video input in a processor, comprising:
    receiving a video input; and
    adjusting said video input, utilizing a transfer function employing a lookup table (LUT), wherein said LUT is divided into multiple segments and a step size between entries in one segment of said multiple segments is different than a step size between entries in another segment of said multiple segments, wherein said step sizes in said multiple segments vary based on deviations between interpolated values and actual values of said transfer function in said multiple segments.

2. The method as recited in claim 1, wherein said transfer function is one of a high dynamic range (HDR) electro-optical transfer function (EOTF), a HDR optical-electro transfer function (OETF), electrical to electrical transfer function (EETF), optical to optical transfer function (OOTF), or inverse EOTF.

3. The method as recited in claim 1, wherein said transfer function is one of a gamma transfer function and an inverse gamma transfer function.

4. The method as recited in claim 1, wherein said transfer function is a digital imaging transfer function.

5. The method as recited in claim 1, wherein said transfer function is a perceptual quantizer (PQ) transfer function.

6. The method as recited in claim 1, further comprising: transmitting said adjusted video input to a viewing system.

7. The method as recited in claim 1, further comprising: transmitting said adjusted video input to a storage medium.

8. The method as recited in claim 1, wherein said steps sizes are reduced when said deviations are greater than a deviation target value.

9. The method as recited in claim 1, wherein said LUT is divided into said multiple segments based on video parameters.

10. The method as recited in claim 9, wherein said video parameters include at least one of a targeted system configuration parameter, a video input content style, a location parameter, a user preference, and a deviation target value.

11. The method as recited in claim 1, wherein said processor is a graphics processing unit (GPU).

12. The method as recited in claim 1, wherein said LUT stores a loge value of a step size.

13. A video processing transfer function system, comprising:
a receiver, operable to receive a video input and video parameters, wherein said video parameters are determined from said video input and said video parameters are used for at least one of an electro-optical transform (EO), an optical-electro transform (OE), an electrical to electrical transform (EE), an optical to optical (OO) transform, or an inverse EO transform;
a storage, operable to store said video input, said video parameters, an adjusted video, and a lookup table (LUT); and
a video processor, operable to generate said adjusted video by executing a transfer function on said video input, wherein said transfer function utilizes said LUT, wherein said LUT is divided into multiple segments, and a step size between entries in one segment of said multiple segments is different than a step size between entries in another segment of said multiple segments, wherein said step sizes in said multiple segments vary based on deviations between interpolated values and actual values of said transfer function in said multiple segments.

14. The system as recited in claim 13, wherein said EO transform is one of a high dynamic range (HDR) EO transform function, gamma transform function, perceptual quantizer (PQ) transform function, or digital imaging transfer function.

15. The system as recited in claim 13, wherein said OE transform is one of a HDR OE transform function, inverse-gamma transform function, PQ transform function, or digital imaging transfer function.

16. The system as recited in claim 13, wherein said system is part of a graphics processing unit (GPU).

17. The system as recited in claim 13, further comprising: a communicator, operable to transmit said adjusted video.

18. The system as recited in claim 13, wherein said LUT is divided into said multiple segments based on video parameters, which include at least one of a targeted system configuration parameter, a video input content style, a location parameter, a user preference, and a target error deviation value.

19. The system as recited in claim 13, wherein said video processor is operable to generate and modify said video parameters.

20. The system as recited in claim 13, wherein said video input is from an optical source or a digital electronic source.

21. A computer program product having a series of operating instructions stored on a non-transitory computer-readable medium that directs a data processing apparatus when executed thereby to perform operations to generate an adjusted video utilizing a lookup table (LUT), comprising:
receiving a first video;
converting said first video to a second video, utilizing a transfer function employing said LUT, and wherein said LUT is divided into multiple segments and a step size between entries in one segment of said multiple segments is different than a step size between entries in another segment of said multiple segments, wherein said step sizes in said multiple segments vary based on deviations between interpolated values and actual values of said transfer function in said multiple segments; and
generating said second video, utilizing said first video.

22. The computer program product as recited in claim 21, further comprising:
receiving a video parameter, wherein said video parameter is associated with said first video; and
wherein said LUT is divided into said multiple segments using said video parameter.

23. The computer program product as recited in claim 21, wherein said video parameter includes at least one of a targeted system configuration parameter, a video input content style, a location parameter, a user preference, and a target error deviation value.

24. The computer program product as recited in claim 21, wherein said transfer function is at least one of an electro-optical, optical-electro, electrical to electrical, optical to optical, inverse electro-optical, gamma, inverse-gamma, perceptual quantizer, or digital imaging.

25. The computer program product as recited in claim 21, wherein said computer program product is executed on a graphics processing unit (GPU).

* * * * *